US005752259A

United States Patent [19]
Tran

[11] Patent Number: 5,752,259
[45] Date of Patent: May 12, 1998

[54] INSTRUCTION CACHE CONFIGURED TO PROVIDE INSTRUCTIONS TO A MICROPROCESSOR HAVING A CLOCK CYCLE TIME LESS THAN A CACHE ACCESS TIME OF SAID INSTRUCTION CACHE

[75] Inventor: Thang M. Tran, Austin, Tex.

[73] Assignee: Advanced Micro Devices, Inc., Sunnyvale, Calif.

[21] Appl. No.: 621,960

[22] Filed: Mar. 26, 1996

[51] Int. Cl.$^6$ ................................................ G06F 12/00
[52] U.S. Cl. ........................ 711/125; 711/5; 395/382; 364/243.42; 364/244.7; 364/261.3; 364/DIG. 1
[58] Field of Search ................ 711/5, 125; 395/382, 395/586; 364/243.42, 244.7, 261.3, DIG. 1

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,661,900 | 4/1987 | Chen et al. | 395/800.04 |
| 4,807,115 | 2/1989 | Torng | 395/391 |
| 4,858,105 | 8/1989 | Kuriyama et al. | 395/582 |
| 5,226,126 | 7/1993 | McFarland et al. | 395/394 |
| 5,226,130 | 7/1993 | Favor et al. | 395/585 |
| 5,392,443 | 2/1995 | Sakakibara et al. | 395/800.09 |
| 5,526,507 | 6/1996 | Hill | 395/441 |
| 5,557,782 | 9/1996 | Witkowski et al. | 395/559 |
| 5,619,662 | 4/1997 | Steely, Jr. et al. | 395/392 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—John E. Harrity
*Attorney, Agent, or Firm*—Conley, Rose & Tayon; B. Noel Kivlin

[57] ABSTRACT

An apparatus including a banked instruction cache and a branch prediction unit is provided. The banked instruction cache allows multiple instruction fetch addresses (comprising consecutive instruction blocks from the predicted instruction stream being executed by the microprocessor) to be fetched concurrently. The instruction cache provides an instruction block corresponding to one of the multiple fetch addresses to the instruction processing pipeline of the microprocessor during each consecutive clock cycle, while additional instruction fetch addresses from the predicted instruction stream are fetched. Preferably, the instruction cache includes at least a number of banks equal to the number of clock cycles consumed by an instruction cache access. In this manner, instructions may be provided during each consecutive clock cycle even though instruction cache access time is greater than the clock cycle time of the microprocessor. Because consecutive instruction blocks from the instruction stream are fetched concurrently, the branch prediction unit stores a prediction for a non-consecutive instruction block with each instruction block. For example, for an instruction cache having a cache access time which is twice the clock cycle time, a prediction for the second consecutive instruction block following a particular instruction block within the predicted instruction stream is stored. When a pair of consecutive instruction blocks are fetched, predictions for a second pair of consecutive instruction blocks within the instruction stream subsequent to the pair of consecutive instruction blocks are formed from the branch prediction information stored with respect to the pair of consecutive instruction blocks.

20 Claims, 8 Drawing Sheets

INSTRUCTION CACHE CONFIGURED TO PROVIDE INSTRUCTIONS TO A MICROPROCESSOR HAVING A CLOCK CYCLE TIME LESS THAN A CACHE ACCESS TIME OF SAID INSTRUCTION CACHE

BACKGROUND OF THE INVENTION

1. Field of the Invention

This invention is related to microprocessors and, more particularly, to caches within microprocessors.

2. Description of the Relevant Art

Superscalar microprocessors achieve high performance by executing multiple instructions per clock cycle and by choosing the shortest possible clock cycle consistent with the design. Conversely, superpipelined microprocessors include a large number of pipeline stages for executing an instruction, such that an extremely short clock cycle may be supported. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises decoding the instruction, executing the instruction, and storing the execution results in the destination identified by the instruction).

In order to further increase performance, microprocessors typically include one or more caches for storing instructions and data. A cache is a storage device configured onto the same semiconductor substrate as the microprocessor, or coupled nearby. The cache may be accessed more quickly than a main memory system coupled to the microprocessor. Generally speaking, a cache stores data and instructions from the main memory system in cache lines. A cache line comprises a plurality of contiguous bytes. The contiguous bytes are typically aligned in main memory such that the first of the contiguous bytes resides at an address having a certain number of low order bits set to zero. The certain number of low order bits is sufficient to uniquely identify each byte within the cache line. The remaining bits of the address form a tag which may be used to refer to the entire cache line. As used herein, the term "address" refers to a value indicative of the storage location within main memory corresponding to one or more bytes of information.

Caches may be organized into an "associative" structure (also referred to as "set associative"). In an associative structure, the cache lines are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple cache lines of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The tag addresses (or tags) associated with bytes stored in the cache are also stored.

The cache lines configured into a row form the columns of the row. Each cache line within a row is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select which bytes are transferred to the outputs of the cache.

Microprocessors may be configured with a single cache which stores both instructions and data, but are more typically configured with separate instruction and data caches. Instruction caches are accessed with a fetch address, and bytes from the corresponding cache line which are subsequent to the byte identified by the address are conveyed into the instruction processing pipeline along with the identified byte. In other words, the bytes which are stored at higher order memory locations within the cache line are conveyed along with the identified byte. Bytes prior to the identified byte within the cache line are discarded. The term "instruction block" will be used herein to refer to the bytes conveyed when a fetch address accesses the instruction cache. The bytes within the instruction block comprise one or more instructions which are to be executed in the instruction processing pipeline. The instruction block begins at the byte identified by the corresponding fetch address and ends at either the end of the cache line or at a branch instruction within the cache line for which a branch prediction unit is storing a branch prediction.

As advances in transistor fabrication technologies have both decreased the size of the transistor and increased the switching speed of the transistor, microprocessor designers have been able to include larger caches within the microprocessor and have been able to design higher frequency (i.e. shorter clock cycle) microprocessors. Including larger caches may increase the performance of the microprocessor. The larger caches may store more data and/or instructions, thereby advantageously increasing the hit rate. Unfortunately, increasing the size of the caches generally creates a greater cache access time. Cache access time may increase to the point of becoming the limiting factor upon clock cycle time. Alternatively, cache access time may increase to a larger time interval than the clock cycle time. The term "cache access time" refers to the interval of time required from the presentation of an address to the cache until the corresponding bytes are available for use by the microprocessor. For example, a set associative cache access time includes time for indexing the cache storage, time for comparing the tags to the access address in order to select a way, and time for conveying the selected data from the cache.

Increasing cache access time is particularly deleterious to instruction caches employed within high frequency microprocessors. In order to supply sufficient instructions to the instruction processing pipeline, the instruction cache is characterized by a large bandwidth (i.e. number of instructions fetched per second). Increasing the cache access time reduces bandwidth, particularly when cache access time becomes longer than the clock cycle time of the microprocessor. In these cases, the reduced bandwidth may result in instructions not being provided to the instruction processing pipeline of the microprocessor during each consecutive clock cycle. Bandwidth may be increased by increasing the cache line size such that more bytes are accessed with each address. Unfortunately, branch instructions may cause many of the additional bytes to be discarded. In the x86 instruction set, for example, branches occur once every four instructions on the average. Additionally, branch instructions are typically taken (i.e. cause instruction fetch to transfer to the target address of the branch instruction) 60–70% of the time. The average x86 instruction is about 3 bytes long. Therefore, on the average, every 12 bytes a branch instruction occurs and is often taken. Bytes subsequent to the branch instruction are discarded when the branch is taken. Performance is not increased by the increased bandwidth made possible by a larger instruction cache line size in these cases. A better method for increasing the bandwidth of instruction caches is desired.

SUMMARY OF THE INVENTION

The problems outlined above are in large part solved by a banked instruction cache and branch prediction unit configured in accordance with the present invention. The banked instruction cache allows multiple instruction fetch addresses to be fetched concurrently. The multiple concurrent fetch addresses comprise consecutive instruction blocks from the predicted instruction stream being executed by the microprocessor. The instruction cache provides an instruction block corresponding to one of the multiple fetch addresses to the instruction processing pipeline of the microprocessor during each consecutive clock cycle, while additional instruction fetch addresses from the predicted instruction stream are fetched. Preferably, the instruction cache includes at least a number of banks equal to the number of clock cycles consumed by an instruction cache access. In this manner, instructions may be provided during each consecutive clock cycle even though instruction cache access time is greater than the clock cycle time of the microprocessor. Advantageously, the instruction cache may be characterized by sufficient bandwidth for the instruction processing pipeline to which it is coupled. The instruction processing pipeline may often have enough instructions to fully utilize the execution resources of the pipeline. Performance may be increased by allowing a large instruction cache with a relatively long cache access time to be included within a microprocessor having a relatively short clock cycle time (in that hit rates may be higher, etc.), while still being capable of providing additional instructions to the instruction processing pipeline during each consecutive clock cycle.

Because consecutive instruction blocks from the instruction stream are fetched concurrently, the branch prediction unit stores a prediction for a non-consecutive instruction block with each instruction block. For example, for an instruction cache having a cache access time which is twice the clock cycle time, a prediction for the second consecutive instruction block following a particular instruction block within the predicted instruction stream is stored. When a pair of consecutive instruction blocks are fetched, predictions for a second pair of consecutive instruction blocks within the instruction stream subsequent to the pair of consecutive instruction blocks are formed from the branch prediction information stored with respect to the pair of consecutive instruction blocks. Advantageously, a predicted instruction stream is formed by simultaneously predicting multiple consecutive instruction blocks.

Broadly speaking, the present invention contemplates an apparatus for providing instruction blocks in a microprocessor, comprising an instruction cache and a branch prediction unit. The instruction cache has a cache access time greater than a clock cycle time employed by the microprocessor, and includes a plurality of banks. A particular instruction block is stored within one of the plurality of banks. The branch prediction unit is coupled to the instruction cache, and is configured to provide the instruction cache with a plurality of fetch addresses during a first clock cycle. The plurality of fetch addresses represent a portion of a predicted instruction stream. Each of the plurality of fetch addresses accesses a different one of the plurality of banks. The instruction cache is configured to provide a plurality of instruction blocks. Each of the plurality of instruction blocks corresponds to one of the plurality of fetch addresses. Furthermore, the instruction cache is configured to provide the plurality of instruction blocks during a plurality of consecutive clock cycles.

The present invention further contemplates a method for providing instruction blocks in a microprocessor, comprising several steps. A first plurality of addresses is fetched from an instruction cache during a first clock cycle. The instruction cache has a cache access time greater than a clock cycle time of the microprocessor. Each of the first plurality of addresses accesses a different one of a plurality of banks configured into the instruction cache. A second plurality of addresses is predicted based upon the first plurality of addresses. The second plurality of addresses are checked for bank conflicts. Certain ones of the second plurality of addresses are modified to eliminate bank conflicts. A plurality of instruction blocks corresponding to the first plurality of addresses are provided to the microprocessor. Each of the plurality of instruction blocks is provided during one of a plurality of consecutive clock cycles.

The present invention still further contemplates a microprocessor comprising an instruction cache, a branch prediction unit, and an instruction scan and decode unit. The instruction cache has a cache access time greater than a clock cycle time employed by the microprocessor. Additionally, the instruction cache includes a plurality of banks wherein a particular instruction block is stored within one of the plurality of banks. The branch prediction unit is coupled to the instruction cache, and is configured to provide the instruction cache with a plurality of fetch addresses during a first clock cycle. The plurality of fetch addresses represent a portion of a predicted instruction stream. Each of the plurality of fetch addresses accesses a different one of the plurality of banks. The instruction scan and decode unit is coupled to receive a plurality of instructions from a plurality of instruction blocks corresponding to the plurality of fetch addresses. The instruction scan and decode unit is configured to provide a plurality of decoded instructions in response to the plurality of instructions.

BRIEF DESCRIPTION OF THE DRAWINGS

Other objects and advantages of the invention will become apparent upon reading the following detailed description and upon reference to the accompanying drawings in which.

Figure 1:
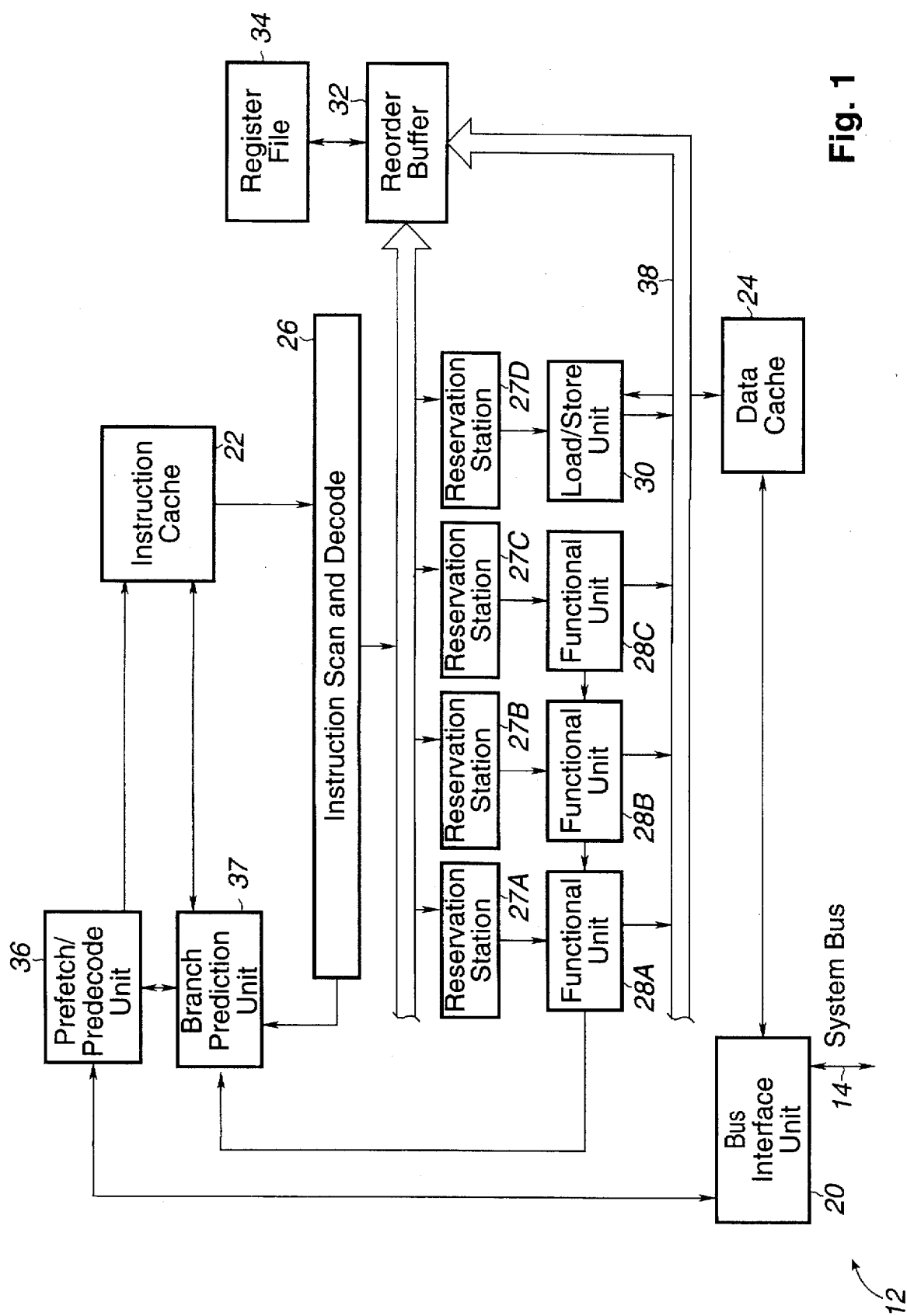
FIG. 1 is a block diagram of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a superscalar microprocessor 12 is shown. Microprocessor 12 includes a bus interface unit 20, an instruction cache 22, a data cache 24, an instruction scan and decode unit 26, a plurality of reservation stations 27A–27D, a plurality of functional units 28A–28C, a load/store unit 30, a reorder buffer 32, a register file 34, a prefetch/predecode unit 36, and a branch prediction unit 37. The plurality of functional units will be collectively referred to herein as functional units 28, and the plurality of reservation stations will be collectively referred to as reservation stations 27. Bus interface unit 20 is coupled to prefetch/predecode unit 36, which is further coupled to instruction cache 22. Additionally, bus interface unit 20 is coupled to data cache 24 and to a system bus 14. Instruction cache 22 is further coupled to instruction scan and decode unit 26, which is in turn coupled to reservation stations 27, reorder buffer 32, and register file 34. Reservation stations 27A–27C are coupled to respective functional units 28A–28C, and reservation station 27D is coupled to load/store unit 30. Reorder buffer 32, reservation stations 27, functional units 28, and load/store unit 30 are each coupled to a result bus 38 for forwarding of execution results. Load/store unit 30 is coupled to data cache 24. Finally, functional units 28 and instruction scan and decode unit 26 are coupled to branch prediction unit 37.

Generally speaking, microprocessor 12 includes circuitry configured to operate within a particular clock cycle time. Instruction cache 22, however, is characterized by a cache access time greater than the particular clock cycle time. In order to produce sufficient bandwidth, instruction cache 22 is configured to fetch multiple instruction fetch addresses concurrently. The instruction blocks corresponding to the instruction fetch addresses comprise consecutive instruction blocks from the predicted instruction stream being executed by microprocessor 12. The term "instruction stream" refers to an ordered set of instructions coded into a program. The instructions are intended to be executed in the order listed, although any order which produces equivalent results may be used. A computer program includes at least one instruction stream, and may include many instruction streams. A "predicted instruction stream" is an instruction stream formed by predicting the outcome of branch instructions included in the instruction stream. Branches may be predicted as "taken", in which the target address of the branch instruction is selected for instruction fetching. Conversely, instructions may be predicted as "not taken", in which the address sequential to the branch instruction (i.e. the instruction stored consecutive to the branch instruction in memory) is selected. Reorder buffer 32 stores instructions according to their order within the predicted instruction stream. Instruction blocks are consecutive within the instruction stream if instruction within the blocks are consecutive in the code sequence being executed. Consecutive instruction blocks may not be stored in consecutive memory locations, but instead may be linked by a branch instruction (i.e. a second instruction block consecutive to a first instruction block may be stored at the target address of a branch instruction within the first instruction block).

Instruction cache 22 is organized into banks. A bank is a set of memory locations which may be accessed separately from another bank. The banks are electrically isolated from one another such that different accesses may be performed concurrently to each of the banks. The different accesses do not interfere with one another. Essentially, each of the banks operates similar to an independent storage array even though the banks are encapsulated within the instruction cache storage. According to one embodiment, each bank stores a number of rows of instruction cache 22. Each instruction block is therefore stored in at most one bank. Concurrently fetched instruction blocks are stored in different banks of instruction cache 22. The concurrently fetched instruction blocks are conveyed to instruction scan and decode unit 26 during consecutive clock cycles. Advantageously, instruction cache 22 is capable of supplying instruction blocks during consecutive clock cycles despite a cache access time greater than the clock cycle time.

Branch prediction unit 37 provides instruction fetch addresses to instruction cache 22. Since consecutive instruction blocks within the instruction stream are fetched concurrently, branch prediction unit 37 employs an improved branch prediction mechanism. In some conventional branch prediction mechanisms, a prediction of the fetch address corresponding to the next consecutive instruction block is stored with each instruction block. The prediction is based upon a branch instruction or instructions within the instruction block. The conventional mechanism is operable for microprocessors which fetch at most a single instruction block during a clock cycle. However, the conventional mechanism is insufficient for microprocessor 12. Microprocessor 12 fetches the next consecutive instruction block concurrently with the current instruction block. Therefore, the next consecutive instruction block is used prior to retrieving the branch prediction information for the current instruction block. The branch prediction mechanism employed by branch prediction unit 37 stores not only the next consecutive instruction block with the current instruction block. In addition, a prediction for a block which is non-consecutive to the current instruction block is stored. For example, instruction cache 22 may have a cache access time which is twice the clock cycle time of microprocessor 12. For this embodiment, branch prediction unit 37 stores a prediction for the next consecutive instruction block as well as the instruction block following the next consecutive instruction block (i.e. the second consecutive instruction block). A pair of instruction blocks are fetched during each instruction cache access. The first of the pair of blocks includes a branch prediction specifying the fetch address of the instruction block to follow the second of the pair of instruction blocks. Typically, this prediction is equal to the next consecutive instruction block prediction stored with the second of the pair of instruction blocks. The second of the pair of instruction blocks predicts the fetch address of the instruction block to follow the instruction block predicted by the first of the pair of instruction blocks. In this manner, instructions are fetched down a predicted instruction stream even though consecutive pairs of instruction blocks within the predicted instruction stream are fetched concurrently.

Prefetch/predecode unit 36 is included for predecoding instructions prior to their storage in instruction cache 22. Predecoding may be employed in embodiments of microprocessor 12 which execute x86 instructions. Because the instructions are of different byte lengths, prefetch/predecode unit 36 may indicate the beginning and end of each instruction within an instruction cache line. This information may be used by instruction scan and decode unit 26 to more efficiently route instructions to reservation stations 27. Additional predecode data may be generated as well.

In the embodiment shown, instruction scan and decode unit 26 decodes each instruction fetched from instruction cache 22. Instruction scan and decode unit 26 dispatches each instruction to a reservation station 27A–27D coupled to a functional unit 28 or load/store unit 30 which is configured to execute the instruction. Instruction scan and decode unit 26 also detects the register operands used by the dispatched instructions and requests these operands from reorder buffer 32 and register file 34. In one embodiment, functional units 28 are symmetrical execution units. Symmetrical execution units are each configured to execute a particular subset of the instruction set employed by microprocessor 12. The subsets of the instruction set executed by each of the symmetrical execution units are the same. In another embodiment, functional units 28 are asymmetrical execution units configured to execute dissimilar instruction subsets. For example, functional units 28 may include a branch execute unit for executing branch instructions, one or more arithmetic/logic units for executing arithmetic and logical instructions, and one or more floating point units for executing floating point instructions. Instruction scan and decode unit 26 dispatches an instruction to a functional unit 28 or load/store unit 30 which is configured to execute that instruction. As used herein, the term "dispatch" refers to conveying an instruction to an appropriate execution unit or load/store unit for execution of the instruction.

Instruction scan and decode unit 26 is further configured to detect a branch instruction which was not predicted by branch prediction unit 37. An instruction block is transmitted to instruction scan and decode block 26 along with an indication of the position within the instruction block of the branch instruction which was predicted. The position of the predicted instruction is included in the branch prediction information stored by branch prediction unit 37. If a branch instruction is decoded and the branch instruction is not the branch instruction predicted for the instruction block, instruction scan and decode unit 26 informs branch prediction unit 37 that a misprediction has occurred.

Still further, functional units 28 detect the execution of a branch instruction for which the prediction is incorrect. The prediction formed by branch prediction unit 37 for a particular branch instruction is conveyed with the branch instruction to the executing functional unit. If the branch is mispredicted, functional units 28 inform branch prediction unit 37. Corrective actions may then be taken to fetch the appropriate instructions.

Load/store unit 30 provides an interface between functional units 28 and data cache 24. Load and store memory operations are performed by load/store unit 30 to data cache 24. Additionally, memory dependencies between load and store memory operations are detected and handled by load/store unit 30.

Reservation stations 27 are provided for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction scan and decode unit 26, functional units 28, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction scan and decode unit 26, requests for register operands are conveyed to reorder buffer 32 and register file 34. In response to the register operand requests, one of three values is transferred to the reservation station 27 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction scan and decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When functional units 28 or load/store unit 30 execute an instruction, the tag assigned to the instruction by reorder buffer 32 is conveyed upon result bus 38 along with the result of the instruction. Reorder buffer 32 stores the result in the indicated storage location. Additionally, reservation stations 27 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to that instruction. Instructions thus discarded are also flushed from reservation stations 27, functional units 28, load/store unit 30, and instruction scan and decode unit 26.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. now U.S. Pat. No. 5,370,903. These documents are incorporated herein by reference in their entirety.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a set-associative or direct-mapped configuration.

Bus interface unit 20 is configured to effect communication between microprocessor 12 and devices coupled to system bus 14. For example, instruction fetches which miss instruction cache 22 may be transferred from main memory by bus interface unit 20. The instructions are conveyed to prefetch/predecode unit 36 for predecoding prior to storing the instructions into instruction cache 22. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction scan and decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and a functional unit 28 performs the execution of the instruction.

Figure 2:
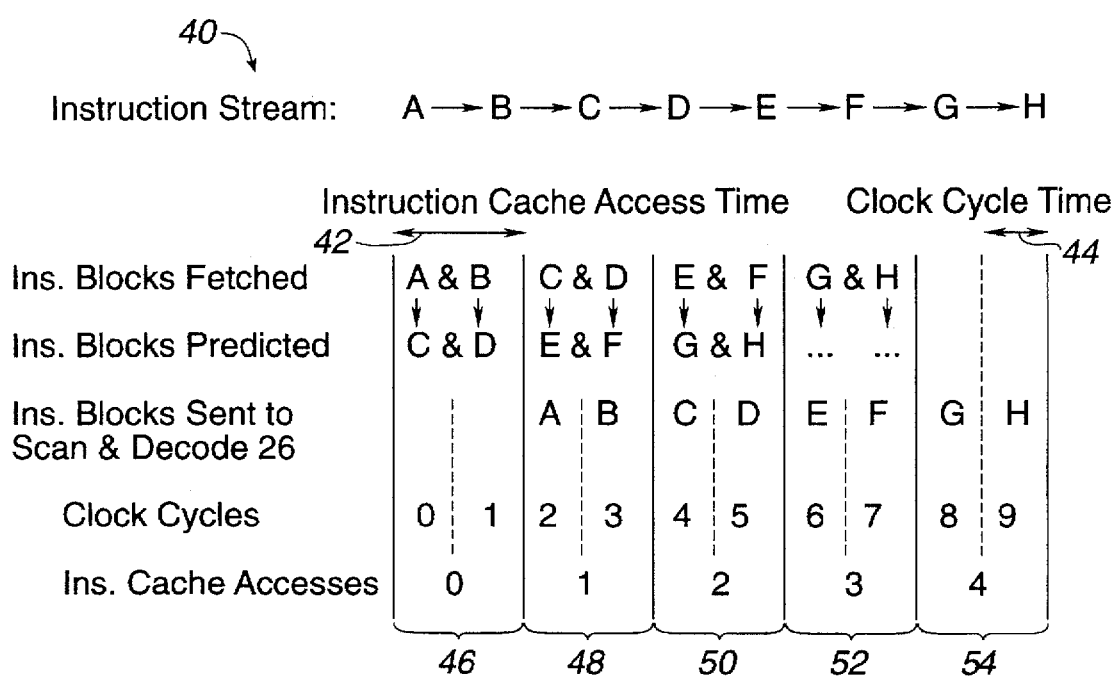
FIG. 2 is a timing diagram of instruction blocks being fetched within the microprocessor shown in FIG. 1.

Turning now to FIG. 2, a timing diagram depicting an exemplary instruction stream 40 is shown. Instruction fetching events are shown according to one embodiment of microprocessor 12. Instruction stream 40 includes a plurality of consecutive instruction blocks represented by the letters A through H. Instructions from instruction block A are foremost in instruction stream 40, followed by instructions from instruction block B, etc. For the timing diagram of FIG. 2, instruction cache access times are depicted as time periods between solid vertical lines (i.e. reference number 42). Clock cycle times are depicted between a solid vertical line and a dashed vertical line (i.e. reference number 44).

For the exemplary timing diagram shown in FIG. 2, instruction cache 22 is characterized by a cache access time which is twice the clock cycle time of microprocessor 12. Therefore, two consecutive instruction blocks from within instruction stream 40 are fetched concurrently from instruction cache 22. During instruction cache access 0 (indicated by reference number 46, performed during clock cycles 0 and 1), instruction blocks A and B are fetched from instruction cache 22. Branch prediction unit 37 forms branch predictions according to branch prediction information corresponding to instruction blocks A and B. In particular, branch prediction information corresponding to instruction block A indicates that instruction block C is consecutive to instruction block B in instruction stream 40. Similarly, branch prediction information corresponding to instruction block B indicates that instruction block D is consecutive to instruction block C in instruction stream 40.

During instruction cache access 1 (reference number 48, performed during clock cycles 2 and 3), instruction blocks C and D are fetched from instruction cache 22. Instruction blocks C and D respectively predict that instruction blocks E and F are consecutive to instruction blocks C and D within instruction stream 40. Additionally, during clock cycle 2 instruction block A is conveyed to instruction scan and decode block 26. During clock cycle 3, instruction block B is conveyed to instruction scan and decode block 26. Instruction cache accesses 2, 3, and 4 (reference numbers 50, 52, and 54) similarly include the fetch of consecutive instruction blocks E, F, G, and H and prediction of the subsequent instruction blocks. Clock cycles 4, 5, 6, 7, 8, and 9 include the conveyance of instruction blocks C, D, E, F, G, and H, respectively, to instruction scan and decode unit 26.

FIG. 2 illustrates that instruction cache 22 is capable of providing instruction blocks to instruction scan and decode unit 26 during each consecutive clock cycle. Instruction blocks may not be provided if instruction fetches miss instruction cache 22, if a branch misprediction is detected, or if a bank conflict is detected by branch prediction unit 37. A bank conflict occurs if a pair of instruction blocks are stored within a particular bank within instruction cache 22 and the pair of instruction blocks are to access instruction cache 22 concurrently. Branch prediction unit 37 may resolve the bank conflict by allowing the instruction block which is the foremost of the pair within instruction stream 40 to be fetched and not allowing the other instruction block to be fetched. Conversely, the other instruction block may be replaced by a sequential instruction block to the foremost of the pair of instruction blocks. A sequential instruction block is an instruction block stored in memory contiguous to and in a higher order memory location than another instruction block to which the sequential instruction block is referenced. For example, the sequential instruction block to the foremost of the pair of instruction blocks is the instruction block stored contiguous to the foremost block in a higher order memory location than the foremost block.

Figure 3:
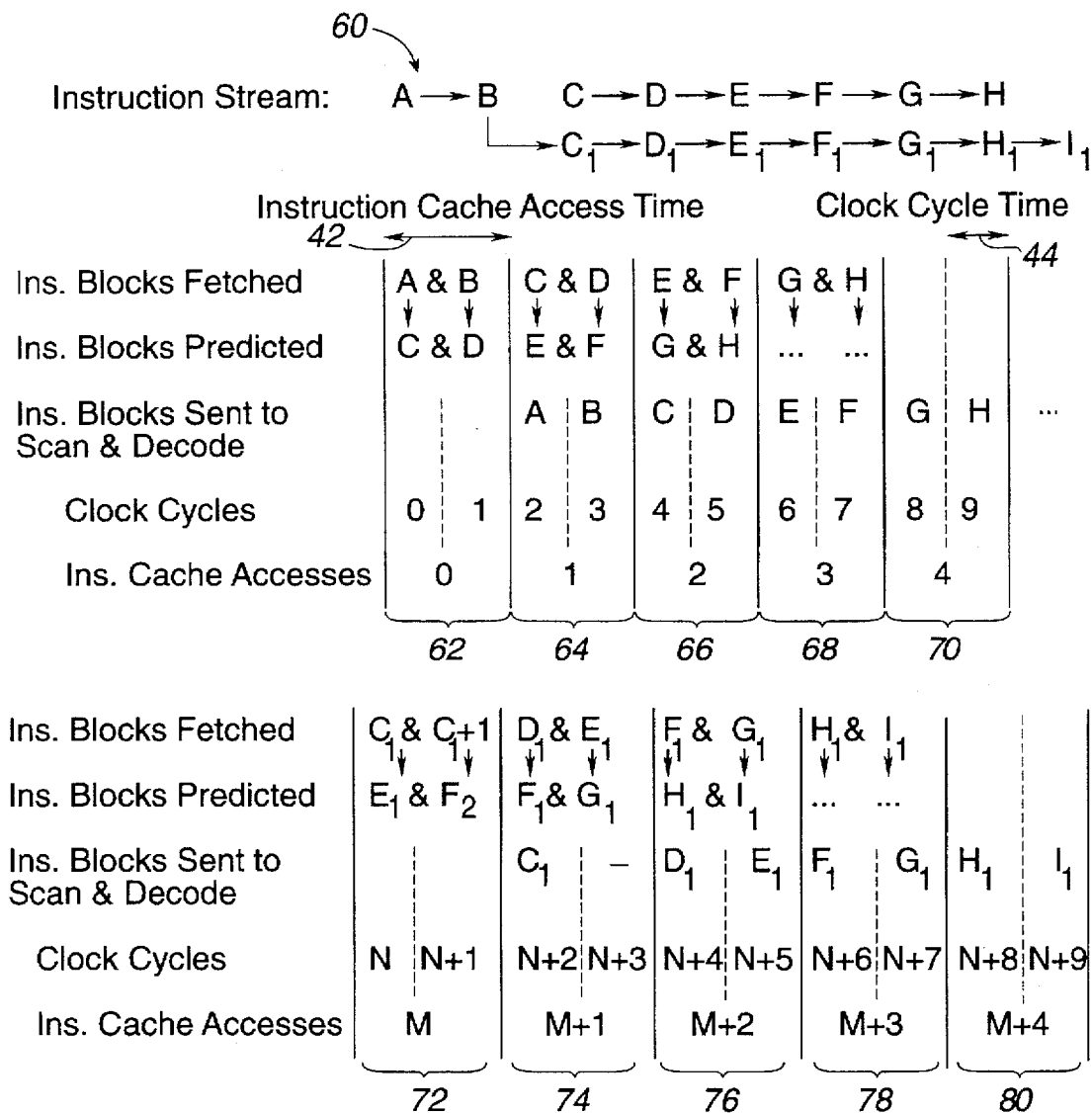
FIG. 3 is a timing diagram showing instruction blocks being fetched within the microprocessor shown in FIG. 1, including a branch misprediction.

Turning next to FIG. 3, a timing diagram depicting events which occur during branch mispredictions is shown. FIG. 3 depicts the events for an exemplary instruction stream 60. Exemplary instruction stream 60 is mispredicted for the instruction block following instruction block B. Instead of predicting instruction block $C_1$, instruction block C is predicted. The predicted instruction stream continues with instruction blocks D, E, F, etc. Once the branch misprediction is detected (either by instruction scan and decode unit 26 or by functional units 28), an indication of the mispredicted branch instruction is conveyed to branch prediction unit 37. In one embodiment, branch prediction unit 37 stores branch prediction information regarding each predicted branch instruction in a prediction buffer. A branch tag is conveyed with each predicted branch instruction. The branch tag is indicative of the position within the prediction buffer which stores branch prediction information corresponding to the predicted branch instruction.

Beneath instruction stream 60, a timing diagram of 5 consecutive instruction cache accesses (occurring during 10 consecutive clock cycles) is shown. As with the timing diagram shown in FIG. 2, the instruction cache access time is indicated by reference number 42, and the clock cycle time by reference number 44. Similar to FIG. 2, the predicted instruction stream is fetched and conveyed to the instruction processing pipeline of microprocessor 12 during instruction cache accesses 0 through 4 (reference numbers 62, 64, 66, 68, and 70, during clock cycles 0 through 9). At a later clock cycle, the misprediction of instruction block C following instruction block B is detected. The corrected instruction stream includes instruction block $C_1$, $D_1$, $E_1$, $F_1$, $G_1$, $H_1$, and $I_1$.

When the misprediction is detected, the instruction fetch address for instruction block $C_1$ is known (it is the correct result of executing the branch instruction). However, the subsequent block ($D_1$) is not known until $C_1$ accesses the branch prediction information stored in branch prediction unit 37. Branch prediction unit 37 uses the address of the sequential instruction block to $C_1$ (denoted as $C_1+1$ in FIG. 3) as the second instruction fetch address for the instruction cache fetch. During instruction cache access M (reference number 72, occurring during clock cycles N and N+1), branch prediction unit 37 fetches instruction blocks $C_1$ and $C_1+1$. The branch prediction information for instruction blocks $C_1$ and $C_1+1$ respectively predict instruction blocks $E_1$ and $F_2$ for instruction fetch. However, the next consecutive instruction block to block $C_1$ is predicted to be $D_1$. The next consecutive instruction block to block $C_1$ is taken from the branch prediction information stored with respect to $C_1$. If $D_1$ is not equal to the sequential instruction block $C_1+1$, branch prediction unit 37 modifies the predicted addresses to fetch instruction block $D_1$ and instruction block $E_1$ during instruction cache access M+1 (reference number 74). Additionally, the instructions corresponding to instruction block $C_1+1$ are discarded. Instruction fetch is thereby resynchronized to the correct path of instruction stream 60 in at most two instruction cache accesses. It is noted that if the next consecutive instruction block stored in the branch prediction information of $C_1$ indicates the sequential instruction block, then instruction blocks $E_1$ and $F_2$ would be fetched during instruction cache access M+1. Instructions from instruction block $C_1+1$ would be conveyed to the instruction processing pipeline of microprocessor 12. Resynchronization would thereby occur in one instruction cache access.

Upon misprediction detection, several branch predictions are updated in branch prediction unit 37. For example, when the $C_1$ misprediction is detected, branch prediction unit 37 updates the branch prediction information for both instruction block A and B. Instruction block A's non-consecutive prediction is updated to indicate instruction block $C_1$, and instruction block B's consecutive prediction is updated to indicate instruction block $C_1$ as well. Subsequently, $C_1+1$ is found to be either incorrect or correct. If correct, the non-consecutive prediction of instruction block B is updated to indicate $C_1+1$. If $C_1+1$ is incorrect, the non-consecutive prediction of instruction block B is updated to indicate instruction block $D_1$.

Reference numbers 76, 78, and 80 show additional instruction cache accesses M+2, M+3, and M+4. These instruction cache accesses and subsequent conveyance of instructions to instruction scan and decode unit 26 depict additional instruction blocks in the corrected predicted path of instruction stream 60. Instruction cache accesses M+2, M+3, and M+4 are similar to instruction cache accesses 1, 2, and 3 (i.e. branch prediction unit 37 and instruction cache 22 have recovered from the branch misprediction).

Figure 4:
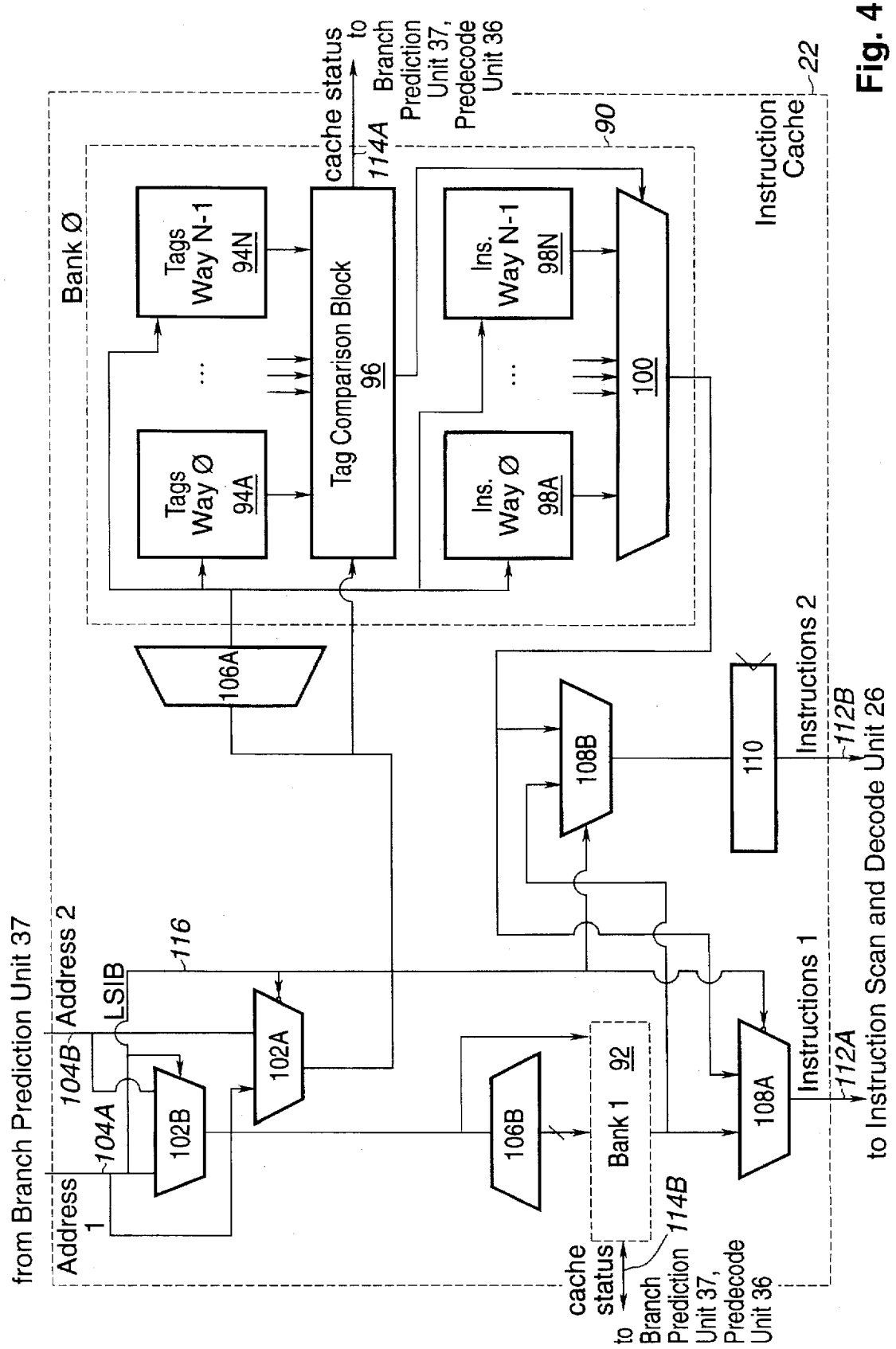
FIG. 4 is a block diagram of one embodiment of an instruction cache shown in the microprocessor shown in FIG. 1.

Turning now to FIG. 4, a block diagram of one embodiment of instruction cache 22 is shown. In this embodiment, instruction cache 22 includes two banks of storage. First bank (or bank 0) 90 and second bank (or bank 1) 92 are included. Internal portions of first bank 90 are shown, and second bank 92 may be configured similarly. Instruction cache 22 is an N way set associative cache, and therefore each bank includes a tag storage for each way (e.g. tag storages 94A–94N in first bank 90). Additionally, a tag comparison block 96 is included, as well as instruction storages for each way (instruction storages 98A–98N). A selection circuit 100 is still further included within first bank 90. Tag storages 94 are coupled to tag comparison block 96, which is additionally coupled to selection circuit 100. Selection circuit 100 is still further coupled to data storages 98.

Instruction cache 22 includes selection circuits 102A and 102B. Selection circuits 102 are each coupled to both address buses 104A and 104B. Each address bus 104 conveys an address from branch prediction unit 37. Selection circuits 102 are further coupled to decoder circuits 106A and 106B. Decoder circuit 106A is coupled to first bank 90. Similarly, decoder circuit 106B is coupled to second bank 92. Selection circuits 102 receive selection controls from address bus 104A as well. A second pair of selection circuits 108A and 108B are included for routing output data from first bank 90 and second bank 92 to instruction scan and decode unit 26. Selection circuit 108B is coupled to a storage circuit 110. Instructions corresponding to the address conveyed upon address bus 104A are routed by selection circuit 108A upon an instruction bus 112A to instruction scan and decode unit 26. Similarly, instructions corresponding to the address conveyed upon address bus 104B are routed by selection circuit 108B and storage circuit 110 upon an instruction bus 112B. Finally, first bank 90 provides cache status for an access upon a cache status bus 114A. Similarly, second bank 92 provides cache status upon cache status bus 114B. For this embodiment, cache status includes a hit/miss indication and the selected way of the cache for a hit. Branch prediction unit 37 receives cache status buses 114 for determining that predicted addresses hit instruction cache 22. Prefetch/predecode unit 36 also may receive cache hit/miss information in order to begin prefetching fetch addresses which miss. It is noted that the configuration of selection circuits 102 and 108 causes the order of instructions conveyed from instruction cache 22 to be determined by the order of the addresses upon address buses 104. Address bus 104A is prior to address bus 104B in program order, and therefore the instructions corresponding to the address upon address bus 104A are routed through selection circuit 108A. Similarly, instruction corresponding to the address upon address bus 104B are routed through selection circuit 108B to storage circuit 110. Instructions are thereby routed from the banks in either order, depending upon the addresses presented by branch prediction unit 37.

Generally speaking, the embodiment of instruction cache 22 shown in FIG. 4 includes two banks which store alternate rows of instruction cache 22. Therefore, each bank includes half as many rows as instruction cache 22 would include if instruction cache 22 were not banked. The number of banks configured into a particular embodiment of instruction cache 22 may be freely selected, but is at least equal to the number of clock cycles which elapse during an instruction cache access. By including this number of banks, instructions may be provided from one of the banks during each clock cycle that an instruction cache access requires. Preferably, more banks than the number of accesses may be included. Bank conflicts may be avoided more often if a larger number of banks than the number of accesses are included. Therefore, if two concurrent accesses are made then four banks may be preferable. Storage circuits similar to storage circuit 110 are employed for storing instruction blocks for each of these clock cycles, such that subsequent accesses to the banks may begin while instruction blocks from the previous accesses are provided to instruction scan and decode unit 26.

As noted above, instruction cache 22 is indexed by a certain set of bits within the addresses which access instruction cache 22. A field of the lowest order bits of the address comprises the offset within the cache line of the address. The number of offset bits is determined by the size of the instruction cache line. For example, a 16 byte instruction cache line implies an offset field comprising the four lowest order bits of the address. A field comprising the lowest order bits of the address which are not included within the offset bits comprises the index field. The index field includes a number of bits sufficient to uniquely identify each row within the cache. For example, if instruction cache 22 includes 64 rows, then the corresponding index field comprises 6 bits. The remaining address bits comprise the tag corresponding to the address. It is noted that one or more bits of the index field are used to select the bank of instruction cache 22.

Branch prediction unit 37 provides a pair of fetch addresses for consecutive instruction blocks upon address buses 104. Decoder circuits 106A and 106B decode a portion of the index of the addresses into a plurality of select lines. One select line is included for each row within first bank 90 and second bank 92. Since first bank 90 and second bank 92 are configured with alternate rows of instruction cache 22, decoder circuits 102 decode the index bits of the address excluding the least significant bit of the index. The least significant index bit identifies the bank accessed by the address. Branch prediction unit 37 guarantees that the addresses conveyed upon address buses 104 will be to different banks. Therefore, the least significant index bit of one of the addresses may be used to select the bank to be accessed by each of the addresses. As shown in FIG. 4, the least significant index bit (LSIB) of the address conveyed upon address bus 104A is routed as the selection control to selection devices 102 and 108 (reference number 116).

An address is provided to a decoder circuit 106 via a corresponding selection circuit 102. Selection circuit 102A selects the address for first bank 90. First bank 90 stores the rows of instruction cache 22 which have a least significant index bit of zero. Therefore, if LSIB 116 is zero, then the address upon address bus 104A is selected into first bank 90. Conversely, if LSIB 116 is one, then the address upon address bus 104B is selected into first bank 90. Since the address upon address bus 104A is selected into first bank 90 if the LSIB is zero, an inversion symbol is shown between LSIB 116 and selection circuit 102A. No inversion symbol is shown between LSIB 116 and selection circuit 102B. Therefore, selection circuits 102A and 102B select opposite ones of the pair of addresses into the respective banks of instruction cache 22. Decoder circuits 106 decode the selected address into select lines for the corresponding bank. It is noted that if the LSIB of address bus 104B does not match the bank which is accessed by that address, then the address is delayed until the following clock cycle (as will be explained in more detail below).

Each bank conveys instruction bytes from the cache line selected by the address conveyed thereto. The output bytes are routed to selection devices 108. Similar to selection devices 102, selection devices 108 select output bytes based upon LSIB 116. Selection devices 108 are provided to route instruction bytes such that the instruction bytes corresponding to the address conveyed upon address bus 104A are conveyed upon instruction bus 112A. Similarly, instruction bytes corresponding to the address conveyed upon address bus 104B are routed to storage device 110 and subsequently upon instruction bus 112B. Instruction scan and decode unit 26 is configured to alternate between instruction bytes upon instruction bus 112A and 112B during consecutive clock cycles. Storage device 110 delays the instruction bytes conveyed thereto by a clock cycle. In this manner, instruction bytes are available to instruction scan and decode unit 26 during consecutive clock cycles, even though instruction cache 22 is characterized by a two clock cycle cache access time. It is noted that the offset bits of the respective fetch address are also routed to instruction scan and decode unit 26 for use in selecting instructions from the instruction bytes conveyed thereto.

Internal portions of first bank 90 will now be described. Select lines from decoder circuit 106A select a tag from each of the tag storages 94. Tag storages 94 comprise a plurality of storage locations. Each storage location is selected by one of the select lines, and stores a tag and cache status information for the corresponding cache line. Tags stored in tag storage 94A correspond to instruction bytes stored in instruction storage 98A. Similarly, tags stored in tag storage 94N correspond to instruction bytes stored in instruction storage 98N. The tag and cache status selected from each tag storage 94 is conveyed to a tag comparison block 96. Tag comparison block 96 compares the tag to the tag portion of the address selected by selection circuit 102A. If a tag match is found and the cache status indicates the cache line is valid, a hit is detected and conveyed upon cache status bus 114A. Additionally, the way which hits is conveyed upon cache status bus 114A for use by branch prediction unit 37.

The select lines from decoder circuit 106A additionally select storage locations within each instruction storage 98. Similar to tag storages 94, instruction storages 98 each comprise a plurality of storage locations. Each storage location is associated with a particular select line, and stores a cache line of instruction bytes. The selected cache lines of instruction bytes are conveyed to selection circuit 100. Selection circuit 100 receives selection controls from tag comparison block 96. Tag comparison block 96 causes selection circuit 100 to transmit the cache line of instruction bytes corresponding to the tag which matches the instruction fetch address. The components of first bank 90 thereby convey instruction bytes corresponding to a particular address. It is noted that tag storages 94 and instruction storages 98 may comprise arrays of random access memory (RAM) cells.

The term selection circuit refers to a circuit configured to select one of two or more inputs as an output in response to selection controls. A selection circuit may comprise a multiplexor circuit. Alternatively, multiple multiplexor circuits coupled in parallel or cascaded may form a selection circuit. Additionally, the term storage circuit refers to a circuit configured to capture a value according to a clock input. The value is stored within the storage circuit for one period of the clock input, and then a new value is captured from the input. The value is typically available at the output of the storage circuit while the value is stored therein. A storage circuit may comprise a register, for example.

Figure 5:
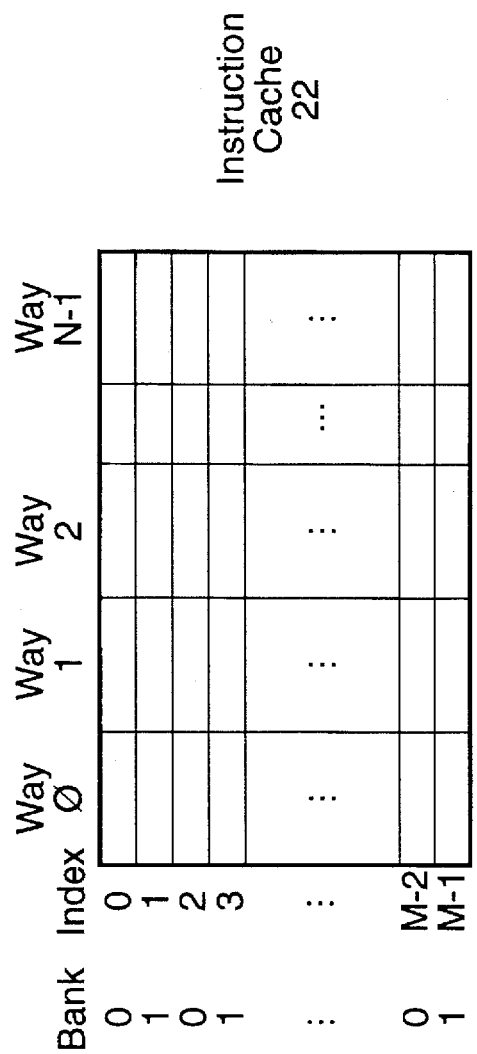
FIG. 5 is a logical diagram of the instruction cache shown in FIG. 4, depicting division of the instruction cache into banks.

Turning next to FIG. 5, a logical diagram of instruction cache 22 is shown. Instruction cache 22 is an N-way set associative cache. Therefore, instruction cache 22 includes a plurality of rows, each row having N ways of instruction cache lines. Instruction cache 22 includes M rows, as indicated by index values 0 through M−1. As an example, instruction cache 22 may be an 8 way 32 kilobyte instruction cache having 16 byte cache lines. For this example, N is 8 and M is 256. If instruction cache 22 includes two banks as shown in FIG. 4, then each bank includes 128 rows in this example.

FIG. 5 also depicts the bank assignment of the rows of instruction cache 22 for the embodiment shown in FIG. 4. As discussed earlier, alternate rows of instruction cache 22 are stored in each bank. In other words, rows corresponding to a least significant index bit of zero are configured into first bank 90. Rows corresponding to a least significant index bit of one are configured into second bank 92.

Figure 6:
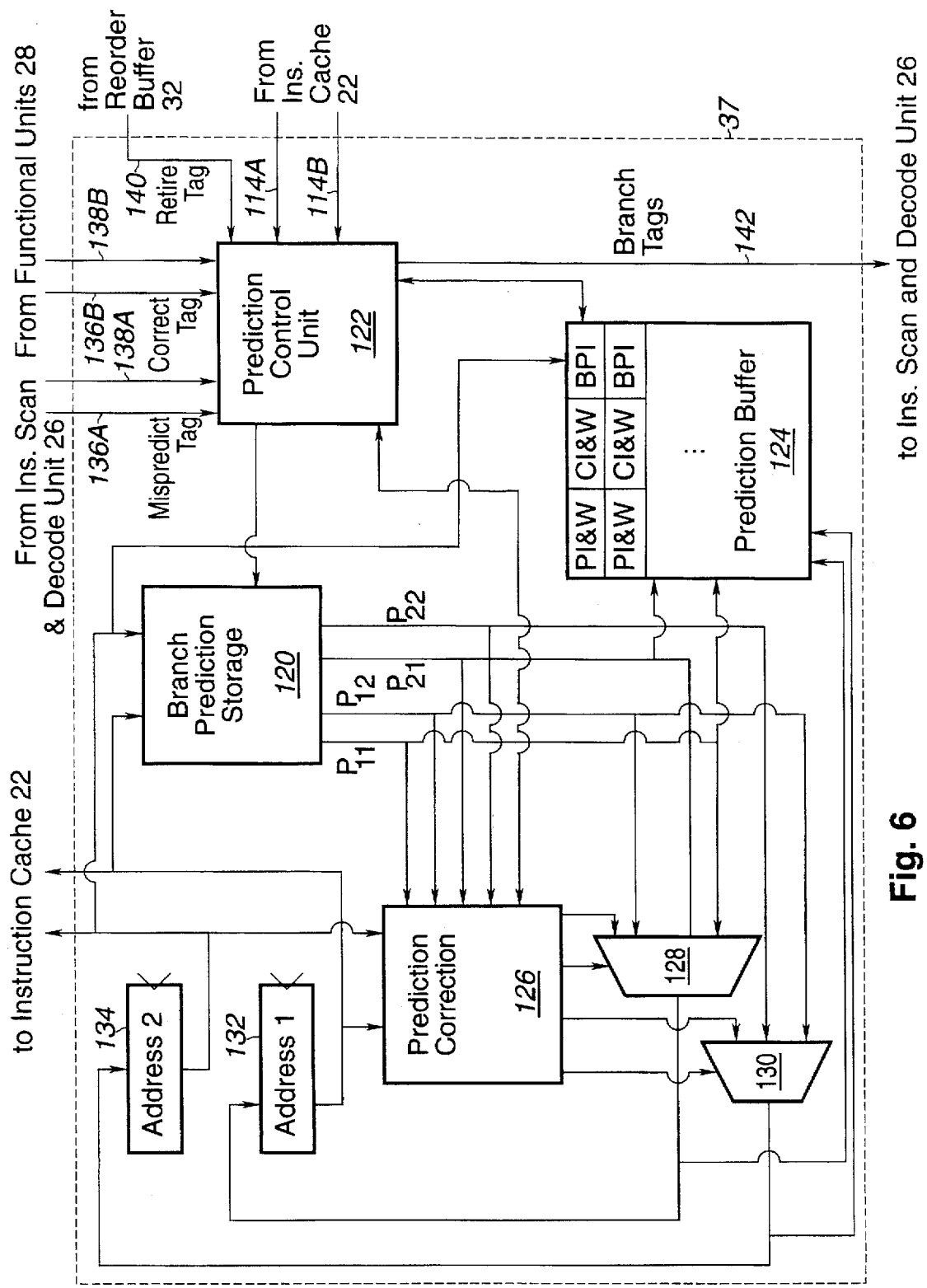
FIG. 6 is a block diagram of one embodiment of a branch prediction unit shown in FIG. 1.

Turning next to FIG. 6, a block diagram of one embodiment of branch prediction unit 37 is shown. Branch prediction unit 37 includes a branch prediction storage 120, a prediction control unit 122, a prediction buffer 124, a prediction correction unit 126, a first selection circuit 128, a second selection circuit 130, a first storage circuit 132, and a second storage circuit 134. Prediction control unit 122 is coupled to a mispredict tag bus 136A and a correct target bus 138A provided by instruction scan and decode unit 26. A similar mispredict tag bus 136B and correct target bus 138B is provided by functional units 28. Additionally, a retire tag bus 140 is coupled between prediction control unit 122 and reorder buffer 32. Cache status buses 114 are coupled to prediction control unit 122. Still further, prediction control unit 122 is coupled to prediction buffer 124. Prediction control unit 122 provides a branch tags bus 142 to instruction scan and decode unit 26.

The following discussion refers to the examples in FIGS. 2 and 3. The terms "address A", "address B", etc. refer to the fetch address corresponding to instruction block A, the fetch address corresponding to instruction block B, etc. The terms address A, address B, etc. are used for brevity. Additionally, the term "prediction" is occasionally used below instead of "branch prediction", again for brevity.

First storage circuit 132 and second storage circuit 134 store the fetch addresses conveyed upon address buses 104A and 104B, respectively (i.e. the instruction block corresponding to the fetch address stored in first storage circuit 132 is prior to the instruction block corresponding to the fetch address stored in storage circuit 134 within the predicted instruction stream). The address stored in storage circuit 132 will therefore be referred to as the primary address, and the address stored in storage circuit 134 will be referred to as the secondary address. Additionally, the addresses are conveyed to branch prediction storage 120 and prediction correction unit 126. Second storage circuit 134 is further coupled to prediction buffer 124. First storage circuit 132 is coupled to selection circuit 128, and second storage circuit 134 is similarly coupled to selection circuit 130. It is noted that first and second storage circuits 132 and 134 are configured to capture values according to the cache access time characterizing instruction cache 22.

Branch prediction storage 120 is configured to store branch prediction information corresponding to each cache line stored in instruction cache 22. Preferably, branch prediction storage 120 is configured as a set associative array having the same dimensions as instruction cache 22. The way selected by instruction cache 22 (conveyed upon cache status buses 114 to prediction control unit 122, coupled to branch prediction storage 120) is used to select the way for each instruction fetch address within branch prediction storage 120. The branch prediction information stored for each cache line comprises a branch prediction identifying the next consecutive instruction block, as well as a branch prediction identifying a non-consecutive instruction block. In one embodiment, a branch prediction comprises a predicted target address, an offset within the cache line at which the branch instruction is stored, and an indication of whether or not the branch is predicted taken or not taken. For example, a two bit saturating counter may be used as the indication. The high order bit comprises the prediction (taken if set, not taken if clear). The counter is incremented each time the branch is taken, and decremented each time the branch is not taken.

Each branch prediction is conveyed as an output of branch prediction storage 120. Branch prediction $P_{11}$ is the branch prediction of the next consecutive block corresponding to the primary address. Branch prediction $P_{12}$ is the non-consecutive branch prediction corresponding to the primary address. Similarly, $P_{21}$ and $P_{22}$ are the next consecutive and non-consecutive branch predictions corresponding to the secondary address. $P_{11}$, $P_{12}$, $P_{21}$, and $P_{22}$ are coupled to prediction correction unit 126 and to selection circuit 128. Additionally, $P_{12}$ and $P_{22}$ are coupled to selection circuit 130. Selection circuits 128 and 130 receive selection controls from prediction correction unit 126. Still further, prediction correction unit 126 provides an input to both selection circuits 128 and 130. The outputs of selection circuits 128 and 130 are further coupled to prediction buffer 124.

The embodiment of branch prediction unit 37 shown in FIG. 6 supports the fetching of a pair of consecutive instruction blocks concurrently. Other embodiments may support other sets of consecutive instruction blocks. During typical instruction cache accesses (i.e. no branch mispredictions, etc., such as the timing diagram of FIG. 2), a primary and secondary address are stored into storage circuits 132 and 134. The primary and secondary addresses are conveyed to branch prediction storage 120, which produces corresponding branch prediction information. The $P_{12}$ and $P_{22}$ predictions are selected by prediction correction unit 126. Predicted target addresses from the predictions are stored as the subsequent primary and secondary addresses during a subsequent cache access. Generally speaking, an address is selected as the next primary or secondary address from the following address: (i) the target address from a branch prediction; (ii) the sequential address for a prediction of not taken or other reasons set forth below; or (iii) a corrected target address from a branch misprediction. As an example, during instruction cache access 0 (reference number 46 in FIG. 2), the values shown in table 1 below are produced by branch prediction unit 37:

TABLE 1

Exemplary Values for Instruction Cache Access 0 in FIG. 2

| Element of Branch Prediction Unit 37 | Instruction Block |
| --- | --- |
| Primary Address | A |
| Secondary Address | B |
| $P_{11}$ | B |
| $P_{12}$ | C |
| $P_{21}$ | C |
| $P_{22}$ | D |
| Next Primary Address | C |
| Next Secondary Address | D |

The Next Primary Address and Next Secondary address entries refer to the output of selection circuit 128 and 130, respectively.

Prediction correction unit 126 is configured to modify the branch predictions provided by branch prediction storage 120. Prediction correction unit 126 may modify the branch predictions if: (i) a bank conflict is detected between the predicted addresses; (ii) the non-consecutive prediction corresponding to an instruction block is different than the next consecutive prediction of the subsequent instruction block; or (iii) a misprediction is detected.

If a bank conflict is detected, prediction correction unit 126 informs instruction scan and decode unit 26 that a bank conflict exists, and therefore no instruction will be conveyed with respect to the prediction $P_{22}$ during this instruction fetch. The access for $P_{22}$ into instruction cache 22 is disabled, thereby saving power by not performing an access of instructions that are to be discarded. Prediction correction unit 126 stores the prediction $P_{22}$ and conveys the target address of the prediction as the next primary address (through selection device 128) for the following instruction cache access. The prediction $P_{12}$ generated during the following instruction cache access is routed as the next secondary address in the following instruction cache access through selection device 130 (assuming the prediction $P_{12}$ does not have a bank conflict with the prior $P_{22}$). For example, if instruction blocks C and D in FIG. 2 had a bank conflict, instruction blocks C would be fetched during instruction cache access 1. During instruction cache access 2, instruction blocks D and E ($P_{12}$ during instruction cache access 1) would be fetched.

Prediction correction unit 126 compares the non-consecutive prediction from a particular instruction block to the next consecutive prediction from the instruction block subsequent to the particular instruction block. If the next consecutive prediction and the non-consecutive prediction do not match, then the next consecutive prediction is used and the non-consecutive prediction is updated. Prediction correction unit 126 signals prediction control unit 122 to update the non-consecutive prediction, and prediction control unit 122 performs the update. More particularly in the present embodiment, prediction $P_{12}$ is compared to prediction $P_{21}$. If a mismatch is detected, prediction $P_{21}$ is selected through selection device 128 instead of prediction $P_{12}$. If the secondary address is an invalid address due to a bank conflict or branch misprediction correction being performed, then this comparison is ignored and $P_{12}$ is selected through selection device 128. It is noted that $P_{22}$ is not compared for correction in this manner, since the corresponding next consecutive prediction is not available. The secondary address may be compared to prediction $P_{11}$ in a similar manner, and the secondary instruction block may be discarded upon detection of a mismatch. The predictions $P_{11}$ and $P_{21}$ may then be used in the subsequent instruction cache access. For example, in instruction cache access 0 shown in FIG. 2 (reference number 46), instruction block A corresponds to the primary address and instruction block B corresponds to the secondary address. If $P_{12}$ (from address A) predicts $C_1$ but $P_{21}$ (from address B) predicts C (different than $C_1$), then address C is selected as the next primary address.

As noted above, each branch prediction includes the offset within the instruction cache line of the branch instruction from which the prediction is generated. This offset may be compared to the offset of the following instruction block address to determine if the branch prediction should be used. If the offset of the following instruction block is greater than the offset of the branch instruction, then the branch instruction is not within the instruction block. For example, a branch instruction having an offset of zero is not included in an instruction block beginning at an offset of three within the same cache line. More particularly, prediction correction unit 126 may compare the secondary address offset to the branch instruction offset included in prediction $P_{12}$. If the offsets indicate that the branch instruction corresponding to prediction $P_{12}$ is not within the instruction block identified by the secondary address, then the prediction $P_{12}$ is replaced by the sequential address of the secondary address instruction block. For example, during instruction cache access 0 in FIG. 2 (reference number 46), if the prediction $P_{12}$ (for address C) corresponding to address A includes an offset of zero and the offset of address B is three, then the prediction for C should not be used. Instead, the address of the instruction block sequential to address B is used.

Finally, prediction correction unit 126 may be informed of a branch misprediction detected by instruction scan and decode unit 26 or functional units 28. The corrected target address received along with the misprediction is conveyed as the next primary address, and the sequential instruction block corresponding to the corrected target is used as the next secondary address.

In addition to forming the next primary and secondary addresses, branch prediction unit 37 stores information related to each branch prediction in branch prediction buffer 124. As noted above, when a branch misprediction occurs with respect to a particular instruction block (i.e. a branch instruction within the particular instruction block is mispredicted), then two branch predictions are updated within branch prediction storage 120. The next consecutive branch prediction for the particular instruction block is updated. Additionally, the non-consecutive prediction of an instruction block prior to the particular instruction block in the instruction stream is updated. Therefore, for each prediction performed by branch prediction unit 37, information regarding the instruction block and the prior instruction block is stored in prediction buffer 124. The index and way of instruction cache 22 storing each instruction block is stored. The index and way of the prior instruction block is stored in PI&W field of the storage location assigned to the prediction. Similarly, the index and way of the current instruction block is stored in CI&W field of the storage location. The branch prediction information used to form the prediction is stored as well, in a BPI field of the storage location. In one particular embodiment, the saturating counter used to form the branch prediction is stored in the BPI field.

The next primary address, the next secondary address, and the secondary address are conveyed to prediction buffer 124 for recording. For the entry allocated to the next secondary address, the current instruction block is identified by the next secondary address and the prior instruction block is identified by the next primary address. The indexes for these addresses are stored in the storage location assigned to the next secondary address. Similarly, for the entry allocated to the next primary address, the current instruction block is identified by the next primary address and the prior instruction block is identified by the secondary address. The indexes corresponding to these addresses are stored. The way values and branch prediction counter values for each entry are provided upon instruction cache access by prediction control unit 122. Prediction control unit 122 assigns a branch tag to each instruction block. The branch tag identifies the storage location within prediction buffer 124 which stores information regarding that instruction block. Branch tags are conveyed to instruction scan and decode unit 26 upon branch tags bus 142, along with the offset of the branch instruction corresponding to the branch prediction.

Instruction cache access 0 in FIG. 2 (reference number 46) may be used as an example of recording branch prediction information in prediction buffer 124. The addresses corresponding to the instruction blocks shown in table 2 below would be generated according to this example:

TABLE 2

Exemplary Values for Instruction Cache Access 0 in FIG. 2

| Element of Branch Prediction Unit 37 | Instruction Block |
|---|---|
| Primary Address | A |
| Secondary Address | B |
| Next Primary Address | C |
| Next Secondary Address | D |
| CI&W, Next Primary Address | C |
| PI&W, Next Primary Address | B |
| CI&W, Next Secondary Address | D |
| PI&W, Next Secondary Address | C |

Therefore, if the prediction that instruction block D is consecutive to instruction block C is incorrect (i.e. a branch instruction within instruction block C is mispredicted), then the next consecutive block prediction for block C and the non-consecutive block prediction for block B are updated. These values are stored in the storage location allocated to the next primary address in the example above.

In addition to providing way and branch prediction information to prediction buffer 124, prediction control unit 122 handles the updates to branch prediction storage 120. Updates may be generated by prediction correction unit 126, as described above. Additionally, updates may be generated by instruction scan and decode unit 26 or functional units 28 detecting a misprediction. When either unit detects a branch misprediction, the branch tag of the mispredicted instruction is conveyed upon the corresponding branch tag bus 136. The corrected target address is conveyed upon the corresponding correct target bus 138. Prediction control unit 122 conveys the corrected target to prediction correction unit 126 for use in fetching instruction blocks from the corrected path. In addition, prediction control unit 122 updates the branch predictions for the indexes and ways stored in prediction buffer 124 in the storage location identified by the transmitted branch tag. The non-consecutive prediction of the index and way stored in the PI&W field is updated, and the next consecutive prediction of the index and way stored in the CI&W field is updated. If the misprediction is detected by instruction scan and decode unit 26, then the target address is updated as well as the prediction counter value. If the misprediction is detected by functional units 28, the prediction counter value is updated but the target address is not changed. When a misprediction is detected, prediction information stored in prediction buffer 124 for addresses fetched subsequent to the mispredicted address is discarded.

Additionally, prediction control unit 122 updates predictions upon retirement of a correctly predicted branch instruction. When a branch instruction is retired, the branch tag corresponding to the instruction is conveyed upon retire tag bus 140 from reorder buffer 32. Prediction control unit 122 updates the non-consecutive prediction of the index and way stored in the selected PI&W field, as well as the next consecutive prediction of the index and way stored in the selected CI&W field. The prediction counter value is incremented or decremented dependent upon the predicted direction.

Prediction control unit 122 may operate prediction buffer 124 in any suitable fashion. However, prediction buffer 124 may be operated as a circular buffer in one embodiment. The circular buffer includes a head pointer and a tail pointer. The head pointer indicates the storage location storing the oldest branch prediction information (i.e. the information corresponding to instruction blocks which are foremost in the instruction stream). The tail pointer indicates the location storing the most recently added information. Since reorder buffer 32 retires instructions in order, the retire branch tag received upon retire bus 140 should indicate the storage location defined by the head pointer. Discard due to misprediction may be accomplished by moving the tail pointer to the storage location indicated by the mispredicted branch tag received upon one of mispredict tag buses 136.

Figure 7:
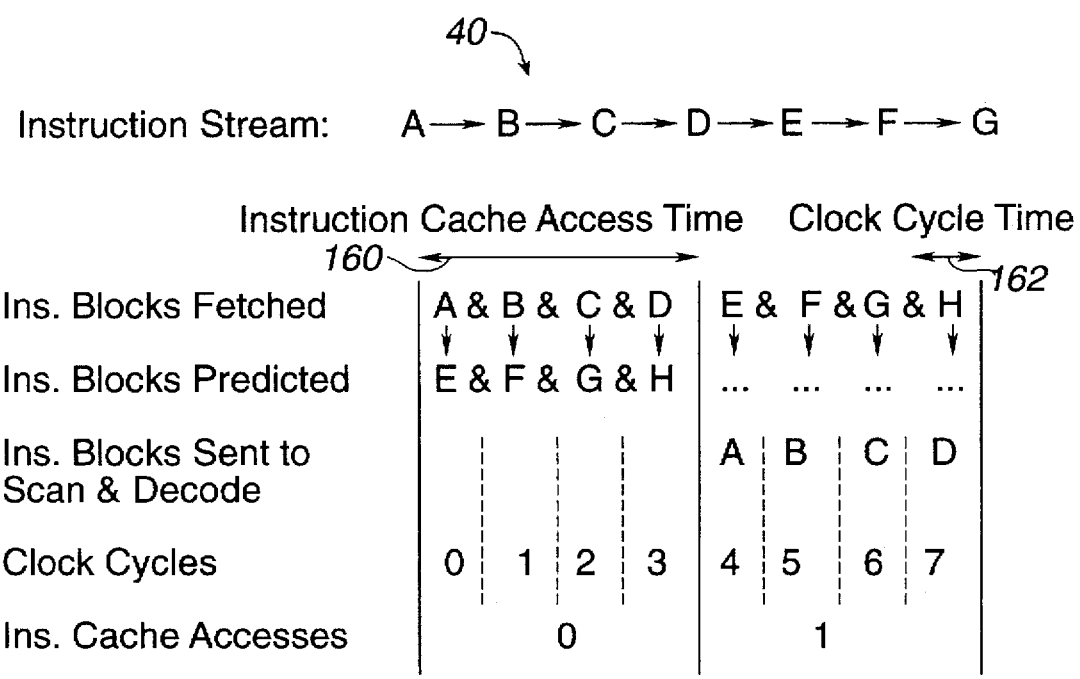
FIG. 7 is a timing diagram showing instruction block fetching according to another embodiment of the microprocessor shown in FIG. 1.

Turning now to FIG. 7, a timing diagram of another embodiment of microprocessor 12 having an instruction cache access time which is four times the clock cycle time is shown. FIG. 7 illustrates that advantages of the present invention may be extended to an instruction cache having a cache access time which is any integer multiple of the clock cycle time. In fact, the cache access time may be any multiple of the clock cycle time. If the cache access time is not an integer multiple of the clock cycle time than a certain amount of time may be wasted between the end of the cache access and the end of the corresponding clock cycle.

The instruction cache access time is illustrated as reference number 160, and the clock cycle time is illustrated as reference number 162. Instruction stream 40 (shown in FIG. 2) is illustrated for the embodiment corresponding to FIG. 7. Since four instruction blocks are concurrently fetched from instruction cache 22, the non-consecutive branch prediction stored for each instruction block is a prediction of the fourth consecutive instruction block following that instruction block. For example, instruction block A predicts instruction block E, instruction block B predicts instruction block F, etc. Similar to FIG. 2, instruction blocks are provided each clock cycle (e.g. instruction block A in clock cycle 4, instruction block B in clock cycle 5, etc.). Instructions are provided each clock cycle even though instruction cache access time is significantly greater than the clock cycle time.

Figure 8:
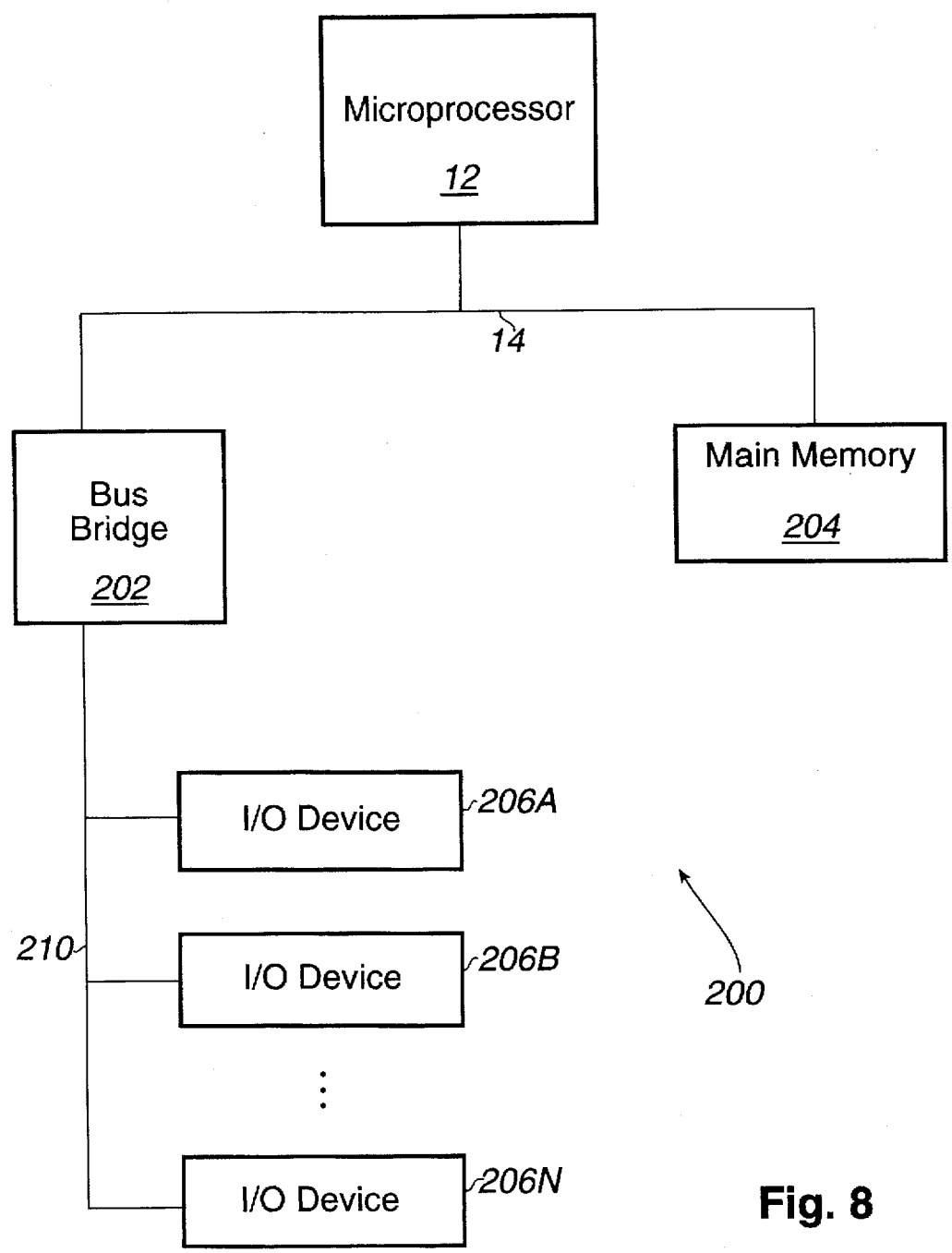
FIG. 8 is a block diagram of a computer system including the microprocessor shown in FIG. 1.

Turning now to FIG. 8, a computer system 200 including microprocessor 12 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 12, bus bridge 202, and main memory 204 are coupled to a system bus 14. I/O devices 206 are coupled to an I/O bus 210 for communication with bus bridge 202.

Bus bridge 202 is provided to assist in communications between I/O devices 206 and devices coupled to system bus 14. I/O devices 206 typically require longer bus clock cycles than microprocessor 12 and other devices coupled to system bus 14. Therefore, bus bridge 202 provides a buffer between system bus 14 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 12 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 12. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 14, or may reside on system bus 14 in a "lookaside" configuration.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded or invalidated in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

In accordance with the above disclosure, an apparatus for continuously providing instructions to an instruction processing pipeline of a microprocessor when the instruction cache includes a cache access time greater than the clock cycle time is described. Advantageously, instruction throughput may be increased since instructions are available to the instruction processing pipeline each clock cycle. Effectively, the bandwidth of the instruction cache has been increased by allowing consecutive instruction blocks to be fetched concurrently. The branch prediction structure is modified to allow the concurrent generation of consecutive instruction block addresses as well. Performance of a microprocessor may be increased by incorporating the apparatus described herein. Performance increases may be realized due to increased instruction throughput. Additionally, shorter clock cycle times may be employed in cases where the cache access time is a limiting factor to the clock cycle time.

Numerous variations and modifications will become apparent to those skilled in the art once the above disclosure is fully appreciated. It is intended that the following claims be interpreted to embrace all such variations and modifications.

What is claimed is:

1. An apparatus for providing instruction blocks in a microprocessor, comprising:

an instruction cache having a cache access time greater than a clock cycle time employed by said microprocessor, said instruction cache including a plurality of banks wherein a particular instruction block is stored within one of said plurality of banks; and a branch prediction unit coupled to said instruction cache, wherein said branch prediction unit is configured to provide said instruction cache with a plurality of fetch addresses during a first clock cycle, said plurality of fetch addresses representing a portion of a predicted instruction stream, and wherein each of said plurality of fetch addresses accesses a different one of said plurality of banks;

wherein said instruction cache is configured to provide a plurality of instruction blocks, and wherein each of said plurality of instruction blocks corresponds to one of said plurality of fetch addresses, and wherein said instruction cache is configured to provide said plurality of instruction blocks during a plurality of consecutive clock cycles.

2. The apparatus as recited in claim 1 wherein said plurality of banks store alternate ones of a plurality of rows configured into said instruction cache.

3. The apparatus as recited in claim 1 wherein said branch prediction unit is configured to predict a second plurality of fetch addresses based upon said plurality of fetch addresses during said first clock cycle, and further configured to provide said second plurality of fetch addresses to said instruction cache during a second clock cycle subsequent to said first clock cycle.

4. The apparatus as recited in claim 3 wherein said second clock cycle occurs a number of consecutive clock cycles subsequent to said first clock cycle.

5. The apparatus as recited in claim 4 wherein said number is equal to a number of said plurality of fetch addresses.

6. The apparatus as recited in claim 3 wherein said branch prediction unit comprises a branch prediction storage configured to store a plurality of branch predictions corresponding to instruction blocks stored in said instruction cache.

7. The apparatus as recited in claim 6 wherein said branch prediction unit is configured to access said branch prediction storage with said plurality of fetch addresses, and wherein a plurality of said plurality of branch predictions received in response to said access are used to form said second plurality of fetch addresses.

8. The apparatus as recited in claim 7 wherein each one of said plurality of branch predictions is indexed within said branch prediction storage by one of said plurality of fetch addresses, and wherein said one of said plurality of branch predictions corresponds to a first instruction block, and wherein said first instruction block is non-consecutive with said one of said plurality of fetch addresses within said predicted instruction stream.

9. The apparatus as recited in claim 7 wherein said branch prediction unit further comprises a control unit coupled to receive said plurality of branch predictions from said branch prediction storage, and wherein said control unit is configured to form said second plurality of fetch addresses, and wherein each one of said second plurality of fetch addresses is formed from one of said plurality of branch predictions if said plurality of branch predictions access different ones of said plurality of banks.

10. The apparatus as recited in claim 9 wherein said control unit is further configured to detect a bank conflict between a first one of said plurality of branch predictions and a second one of said plurality of branch predictions.

11. The apparatus as recited in claim 1 wherein said cache access time comprises an integer multiple of said clock cycle time.

12. The apparatus as recited in claim 11 wherein said integer multiple is a power of two.

13. A method for providing instruction blocks in a microprocessor, comprising:

fetching a first plurality of addresses from an instruction cache during a first clock cycle, said instruction cache having a cache access time greater than a clock cycle time of said microprocessor, wherein each of said first plurality of addresses accesses a different one of a plurality of banks configured into said instruction cache;

predicting a second plurality of addresses based upon said first plurality of addresses;

checking said second plurality of addresses for bank conflicts, and modifying certain ones of said second plurality of addresses to eliminate bank conflicts; and providing a plurality of instruction blocks corresponding to said first plurality of addresses to said microprocessor, wherein each of said plurality of instruction blocks is provided during one of a plurality of consecutive clock cycles.

14. The method as recited in claim 13 wherein a particular one of said second plurality of addresses is predicted in response to a particular one of said first plurality of addresses.

15. The method as recited in claim 14 wherein said particular one of said first plurality of addresses and said particular one of said second plurality of addresses are non-consecutive in an instruction stream being executed by said microprocessor.

16. The method as recited in claim 13 wherein said cache access time comprises an integer multiple of said clock cycle time.

17. A microprocessor, comprising:

an instruction cache having a cache access time greater than a clock cycle time employed by said microprocessor, said instruction cache including a plurality of banks wherein a particular instruction block is stored within one of said plurality of banks;

a branch prediction unit coupled to said instruction cache, wherein said branch prediction unit is configured to provide said instruction cache with a plurality of fetch addresses during a first clock cycle, said plurality of fetch addresses representing a portion of a predicted instruction stream, and wherein each of said plurality of fetch addresses accesses a different one of said plurality of banks; and an instruction scan and decode unit coupled to receive a plurality of instructions from a plurality of instruction blocks corresponding to said plurality of fetch addresses, wherein said instruction scan and decode unit is configured to provide a plurality of decoded instructions in response to said plurality of instructions.

18. The microprocessor as recited in claim 17 wherein said instruction scan and decode unit is configured to detect an unpredicted branch instruction, and wherein said instruction scan and decode unit is configured to notify said branch prediction unit of said unpredicted branch instruction.

19. The microprocessor as recited in claim 17 further comprising a plurality of functional units coupled to receive said plurality of decoded instructions from said instruction scan and decode unit, wherein said plurality of functional units are configured to execute said plurality of decoded instructions.

20. The microprocessor as recited in claim 19 wherein said plurality of functional units are further configured to detect a mispredicted branch instruction within said plurality of decoded instructions, and wherein said plurality of functional units are configured to notify said branch prediction unit of said mispredicted branch instruction.

* * * * *